(12) United States Patent
Seong et al.

(10) Patent No.: US 6,339,601 B1
(45) Date of Patent: *Jan. 15, 2002

(54) METHOD OF, AND FRAME SYNCHRONIZING DEVICE FOR, SYNCHRONIZING SYSTEMS HAVING A DIGITAL INTERFACE

(75) Inventors: Goan-soo Seong; Sung-kyu Choi, both of Seoul (KR)

(73) Assignee: Sansung Electronics Co., Ltd., Kyungki-Do (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/961,805

(22) Filed: Oct. 31, 1997

(30) Foreign Application Priority Data

Jun. 3, 1997 (KR) .............................. 97-22954

(51) Int. Cl.⁷ .............................. H04J 3/06; H04J 3/12; H04L 7/02; H04L 7/00
(52) U.S. Cl. ...................... 370/503; 370/509; 370/513; 370/515; 370/522; 375/359; 375/367; 375/368
(58) Field of Search ................................ 370/503, 509, 370/510, 512, 506; 358/148, 149, 158, 159, 150; 179/15; 178/69

(56) References Cited

U.S. PATENT DOCUMENTS

| 4,004,100 | A | * | 1/1977 | Takimoto | 179/15 |
|---|---|---|---|---|---|
| 4,247,936 | A | * | 1/1981 | Hustig | 370/100 |
| 4,532,547 | A | * | 7/1985 | Bennett | 358/148 |
| 4,876,719 | A | * | 10/1989 | Nakagami et al. | 381/1 |
| 4,885,638 | A | * | 12/1989 | Bennett | 358/148 |
| 5,566,174 | A | | 10/1996 | Sato | 370/84 |
| 5,710,774 | A | * | 1/1998 | Suh et al. | 370/513 |

FOREIGN PATENT DOCUMENTS

| EP | 07327032 | 12/1995 | |
| EP | 0721288 A2 | 7/1996 | |
| EP | 97308244.9 | 8/1999 | |
| JP | 8-335921 | 12/1996 | ............ H04J/3/06 |
| WO | WO 95/27977 | 10/1995 | |
| WO | WO 96/01540 | 1/1996 | |

OTHER PUBLICATIONS

Adam J. Kunzman et al.; "1394 High Performance Ser. Bus:The Digital Interface For ATV"; Aug. 1995; No. 3, pp. 893–900.

* cited by examiner

Primary Examiner—Wellington Chin
Assistant Examiner—M. Phan
(74) Attorney, Agent, or Firm—Sughrue Mion, PLLC

(57) ABSTRACT

A method of, and frame synchronizing device for, synchronizing systems having a digital interface. The systems are synchronized by extracting frame time information from a signal transferred from an external source through a digital interface, generating a frame reset signal, delayed by predetermined time based on the extracted frame time information, and resetting the entire systems based on the generated frame reset signal. Also, the color burst signal is free-oscillated during the digital interface mode in order to accommodate to the frame reset signal, which has a variable period.

21 Claims, 6 Drawing Sheets

METHOD OF, AND FRAME SYNCHRONIZING DEVICE FOR, SYNCHRONIZING SYSTEMS HAVING A DIGITAL INTERFACE

BACKGROUND OF THE INVENTION

The present invention relates to a method of, and frame synchronizing device for, synchronizing systems having a digital interface in audio/video (A/V) apparatuses.

As almost all A/V apparatuses becomes digitized, one apparatus can be controlled by another using a digital interface. When moving picture data is received, the picture cannot be properly restored unless the apparatuses having the digital interface are synchronized. A device that performs this task is referred to as a frame synchronizing device.

FIG. 1 is a block diagram of a conventional frame synchronizing device. A digital interface (DIF) 110 synchronizes external equipment (a master system) which transfers the transport packet, with a digital recording and reproducing apparatus (a slave system), using a cycle timer 113, a time stamp extractor 114 and a comparator 115. The digital interface 110 extracts a time stamp from a transport packet received during a digital interface mode, operates a PLL circuit 120 according to a frame pulse (frame_dif) extracted from frame starting time information in the time stamp, divides a clock signal generated in the PLL circuit 120 by using a divider 130, applies a frame reset pulse (frp) synchronized with the divided clock signal to a channel encoder 140 and a source decoder 150, and applies a horizontal synchronizing signal (H_sync) synchronized with the divided clock signal and a field signal (field) to a video encoder 160. The digital recording and reproducing apparatus, which has an inner bus margin, represents digital video cassette recorder and all digital video camera (DVC) systems such as digital camcorders. The digital recording and reproducing apparatus includes a recording system, constructed of a source encoder (not shown), and a channel encoder 140. It also includes a reproducing system, constructed of a channel decoder (not shown), a source decoder 150 and a video encoder 160. The PLL circuit 120 shown in FIG. 1 also includes a phase discriminator (PD) 121, a low pass filter (LPF) 122 and a voltage controlled crystal oscillator (VCXO) 123.

When a synchronizing signal is required for a system, for example, the channel encoder 140, the source decoder 150, and the video encoder 160, it is generated in the divider 130. Then data is read from a FIFO memory 112 and transferred to the channel encoder 140 and the source decoder 150 through an AV_bus. The data is read according to a control signal (CON), generated during fixed timing on the basis of the frame reset pulse (frp), which is generated in the divider 130. At this time, a color burst signal is generated by being frame-locked inside the video encoder 160 for receiving as input the horizontal synchronizing signal (H_sync) and the field signal (field). The system maintains a four field sequence or an eight field sequence. When receiving color and mono broadcasts in an NTSC broadcasting system, picture quality of the color burst signal deteriorates unless the four field sequence is maintained, because the phase is identical every four fields because a phase difference of 180° exists between lines. In the color burst signal of a PAL broadcasting system, an eight field sequence should be maintained, because the phase is identical every eight fields because a phase difference of 270° exists between lines.

FIG. 2 is a detailed block diagram of the divider 130 shown in FIG. 1. The divider 130 includes:

a) a first line counter 131 for receiving a frequency signal of 18 MHz from the PLL circuit 120 and counting lines;

b) a first pixel counter 132 for counting pixels;

c) a system frame reset pulse generator 133 for receiving the outputs of the first line counter and the first pixel counter and generating the frame reset pulse (frp);

d) a second line counter 134 for receiving a frequency signal of 13.5 MHz from the PLL circuit 120 and counting lines;

e) a second pixel counter 135 for counting pixels; and f) a video encoder synchronism generator 136 for receiving the outputs of the second line counter and the second pixel counter and generating a horizontal synchronizing signal (H-sync) and a field signal (field).

During a digital interface mode, the PLL circuit 120 locks a clock signal oscillating at 54 MHz to a frame pulse (frame_dif) of 15 Hz generated in the digital interface 110, and provides the clock signal to the divider 130 as system clock. The divider 130 divides the system clock and generates a synchronizing signal required for the channel encoder 140, the source decoder 150, and the video encoder 160. When a synchronizing signal, synchronized with the frame pulse of a master system, is generated from a slave system during the digital interface mode, the data stored in the digital interface 110, which is transferred from the master system, is read and transferred to the slave system.

However, the performance of the above-mentioned frame synchronizing device deteriorates because the clock signal generated in the PLL circuit 120 cannot be used unless an extremely precise voltage controlled oscillator is designed. This is because a 54 MHz clock is locked using the frame pulse (frame_dif) input with a frequency of only 15 Hz. Therefore, in a conventional frame synchronizing device, high-priced components, such as a voltage controlled crystal oscillator, must be used because the PLL is locked by a low frame frequency.

SUMMARY OF THE INVENTION

It is an object of the present invention to provide a frame synchronizing device for synchronizing systems, by generating a frame reset signal based on frame time information of external equipment output through a digital interface, and resetting the entire system according to the frame reset signal.

It is another object of the present invention to provide in a recording and reproducing apparatus having a digital interface, a frame synchronizing device for synchronizing systems, by free-oscillating a color signal during a digital interface mode in order to accommodate a frame reset signal having a variable period, when a system is reset by the frame reset signal generated based on external frame time information.

It is still another object of the present invention to provide a frame synchronizing method for synchronizing systems, by generating a frame reset signal based on frame time information of external equipment output through a digital interface, and resetting the entire system by the frame reset signal.

It is still further another object of the present invention to provide a frame synchronizing method for synchronizing systems, by free-oscillating a color signal during a digital interface mode in order to accommodate a frame reset signal having a variable period, when a system is reset by the frame reset signal generated based on external frame time information.

To achieve the above objects, a frame synchronizing device for synchronizing systems is provided which has a digital interface for extracting frame time information included in a received signal from an external source, and a generator for generating a frame reset signal based on the frame time information and synchronizing signals required by the systems, wherein the system is reset by the frame reset signal. The frame synchronizing device according to the present invention further comprises a signal processor for free-oscillating a color burst signal during a digital interface mode when the received signal is source-decoded and then encoded into a display signal and for resetting the color burst signal according to the synchronizing signals during a normal mode.

A frame synchronizing method for synchronizing systems having a digital interface comprises the steps of extracting frame time information included in a received signal from an external source during a digital interface mode and generating a frame reset signal based on the frame time information and synchronizing signals required by the systems and resetting the systems by the frame reset signal.

Also, the frame synchronizing method according to the present invention further comprises the steps of free-oscillating a color burst signal during a digital interface mode and resetting the color burst signal at a period of a predetermined number of fields according to the horizontal synchronizing signal and the field signal during a normal mode.

DETAILED DESCRIPTION OF THE PREFERRED EMBODIMENT

Hereinafter, a method and apparatus for synchronizing frames according to the present invention, will be described with reference to the figures.

Figure 1:
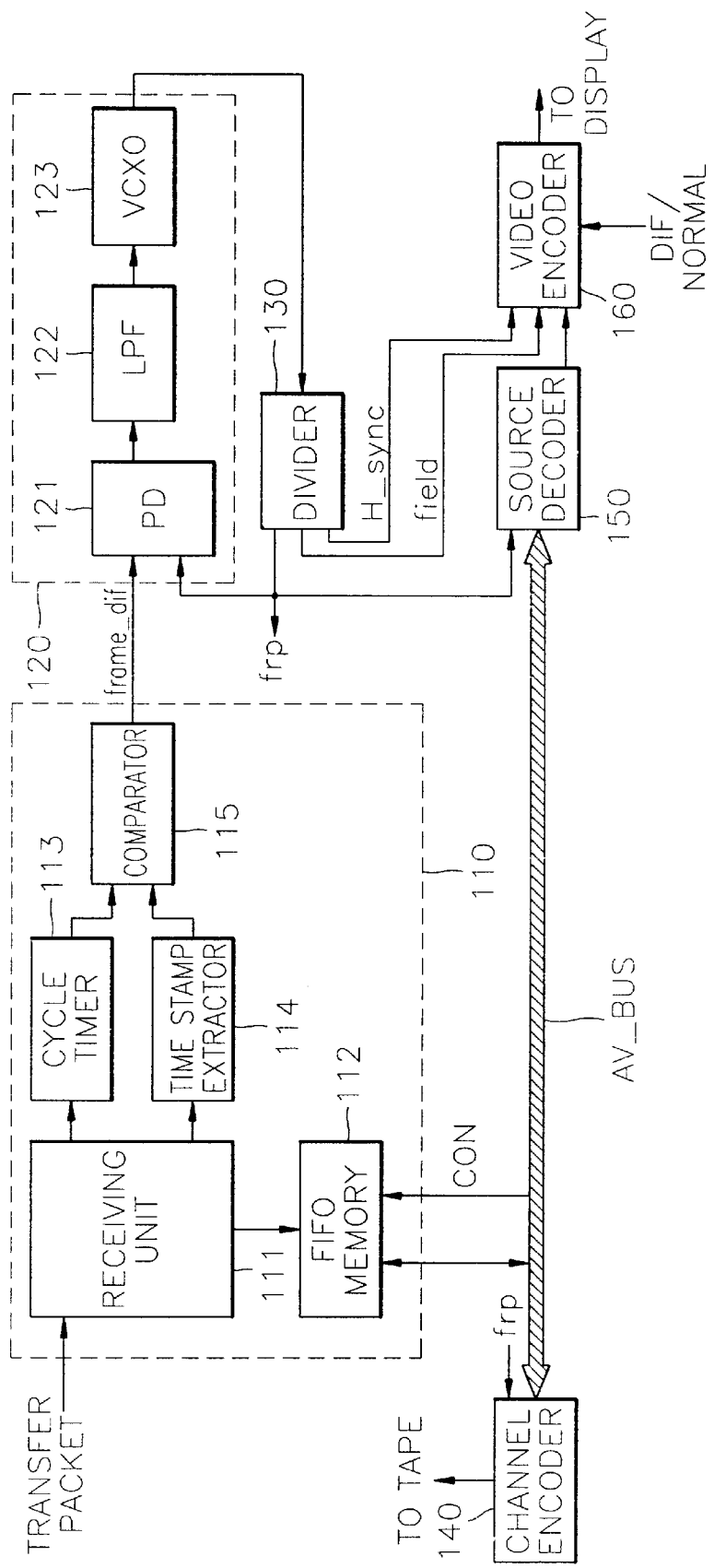
FIG. 1 is a block diagram of a conventional frame synchronizing device.
Figure 2:
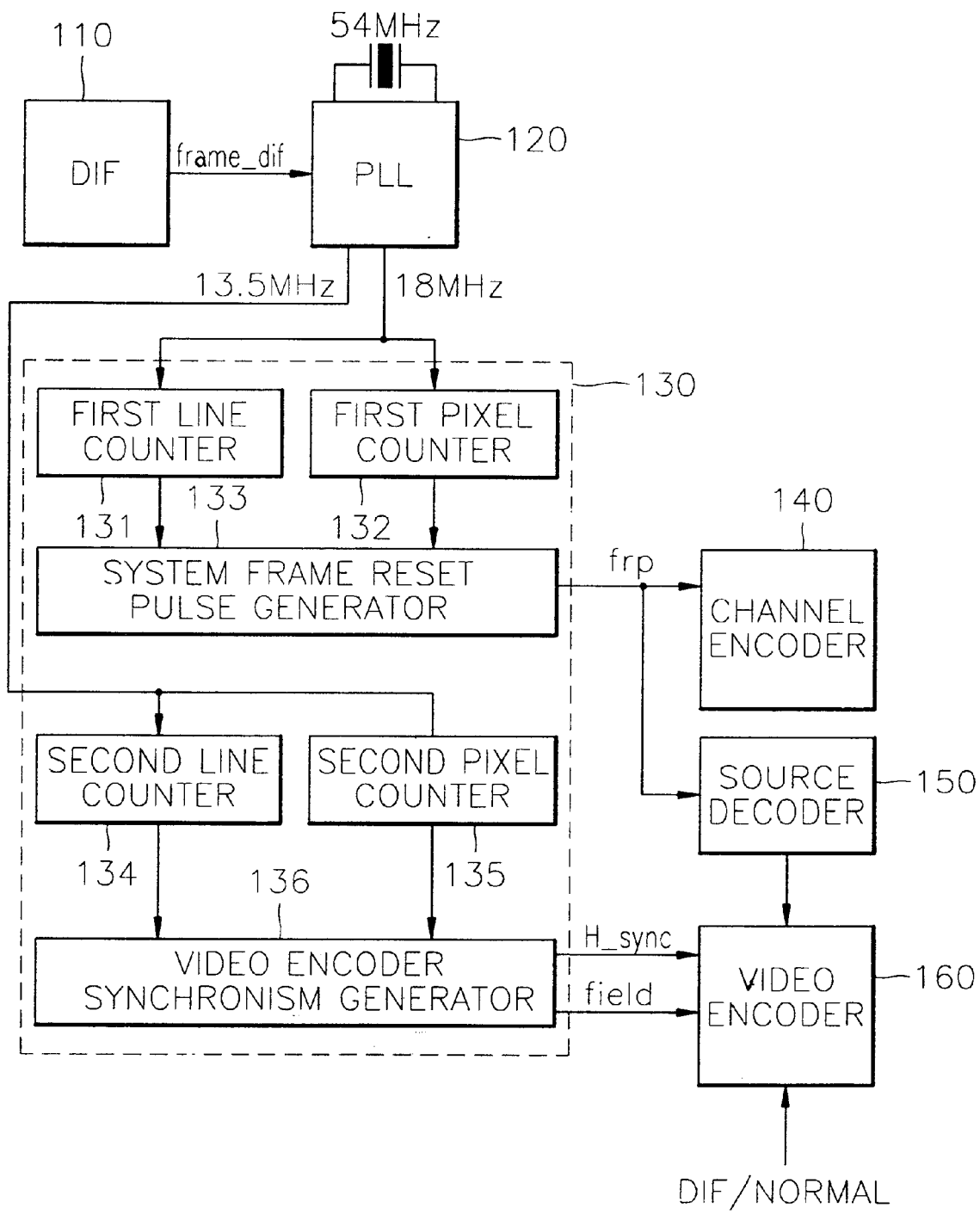
FIG. 2 is a detailed block diagram of a divider shown in FIG. 1.
Figure 3:
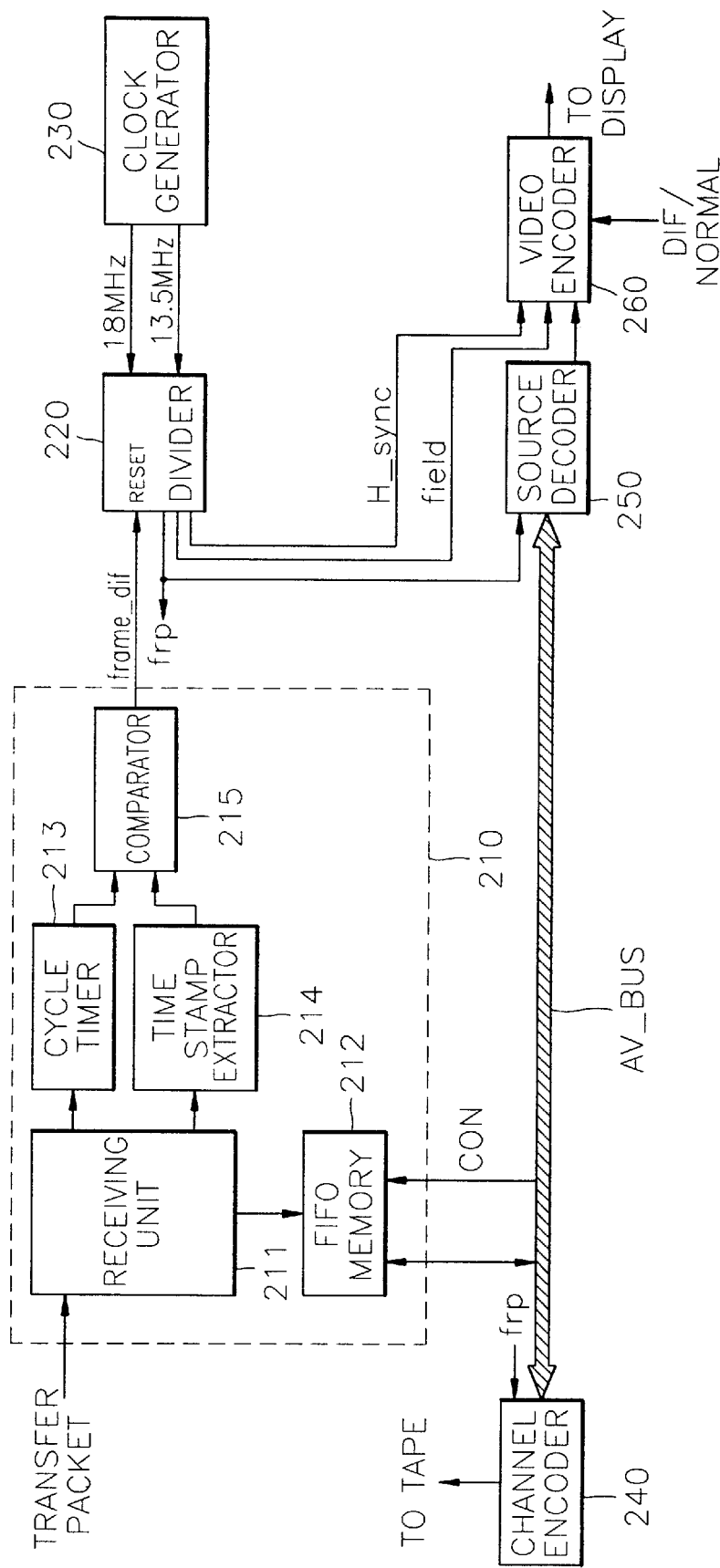
FIG. 3 is a block diagram of a frame synchronizing device according to an embodiment of the present invention.

In FIG. 3, a receiving unit 211, of a digital interface 210, receives data transferred from external equipment in the form of a transport packet, removes an extra header of the transport packet, and writes data without the extra header in a first-in first-out (FIFO) memory 212. A time stamp extractor 214 extracts a time stamp from the transport packet output from the receiving unit 211. The time stamp includes frame starting time information. A cycle timer 213 counts based on a reference clock included in the transport packet, outputs a count value, and renews the counted value in every cycle start packet. A comparator 215 compares the count value of the cycle timer 213 with the frame time information of the time stamp extracted from the time stamp extractor 214 and generates a frame pulse (frame_dif).

The digital interface 210 can be IEEE 1394, which is a high speed data transfer standard defined by the IEEE that is used as an interface for connecting digital A/V apparatuses.

If the digital interface 210 is IEEE 1394, the receiving unit 211 corresponds to a link layer and the FIFO memory 212, through the comparator 215, corresponds to an application layer, in view of a protocol architecture.

A divider 220 receives the frame pulse (frame_dif) output from the digital interface 210 as a reset signal, and generates the frame reset pulse (frp), the horizontal synchronizing signal (H_sync), and the field signal (field), according to a system clock (18 MHz and 13.5 MHz) generated by the clock generator 230. The frame reset pulse (frp) is output to the channel encoder 240 and the source decoder 250. The horizontal synchronizing signal (H_sync) and the field signal (field), are output to the video encoder 260.

The frame reset pulse (frp) is generated in the divider 220 based on the frame pulse (frame-dif) output from the digital interface 210, delayed for a predetermined time. This time is less than the margin time of an inner bus or corresponds to the time for filling data into the FIFO memory 212. At this time, the inner system clock of the channel encoder 240, and that of the source decoder 250, free-oscillate and are not synchronized, and a color burst signal generated by the video encoder 260 is also not frame-locked. Also, at this time, the horizontal synchronizing signal (H_sync) and the field signal (field), are generated in the divider 220 based on the system clock from the clock generator 230. Therefore, the period of the horizontal synchronizing signal (H_sync) is not uniform, however, the number of the horizontal synchronizing signals is constant in frame units.

Meanwhile, data in the FIFO memory 212 is read and transferred to the channel encoder 240 and the source decoder 250 through the AV_bus. The data is read based on a control signal (CON), generated in the source decoder 250 at a predetermined time immediately after the frame reset pulse (frp) is generated in the divider 220.

The channel encoder 240 is reset by the frame reset pulse (frp) output from the divider 220 during the digital interface mode and receives data read from the FIFO memory 212 through the AV_bus. During a normal mode, the channel encoder 240 channel-encodes data, which is source-encoded by a source encoder (not shown), and records it on a recording medium such as a tape. The channel encoder 240 includes an error correction encoder (not shown), for correcting the source-encoded data, and a modulator (not shown), for modulating error-correction encoded data and recording it on a recording medium.

The source decoder 250 is reset by the frame reset pulse (frp) output from the divider 220 during the digital interface mode and receives data read from the FIFO memory 212 through the AV_bus. During the normal mode, the source decoder 250 source-decodes channel-decoded data output from a channel decoder (not shown), and outputs the data to the video encoder 260. The source decoder 250 includes a data decompressor (not shown), for decompressing error correction decoded data, and a deshuffler (not shown), for deshuffling the decompressed data.

The video encoder 260 receives the horizontal synchronizing signal (H_sync) and the field signal (field), output from the divider 220 during a normal mode, based on a digital interface/normal mode signal (DIF/NORMAL). The video encoder 260 resets the color burst signal at a period of a predetermined number of fields, and encodes source decoded data, output from the source decoder 250, as an appropriate signal for display. The video encoder 260 free-oscillates a color burst signal with respect to the color signal during the digital interface mode.

Figure 4:
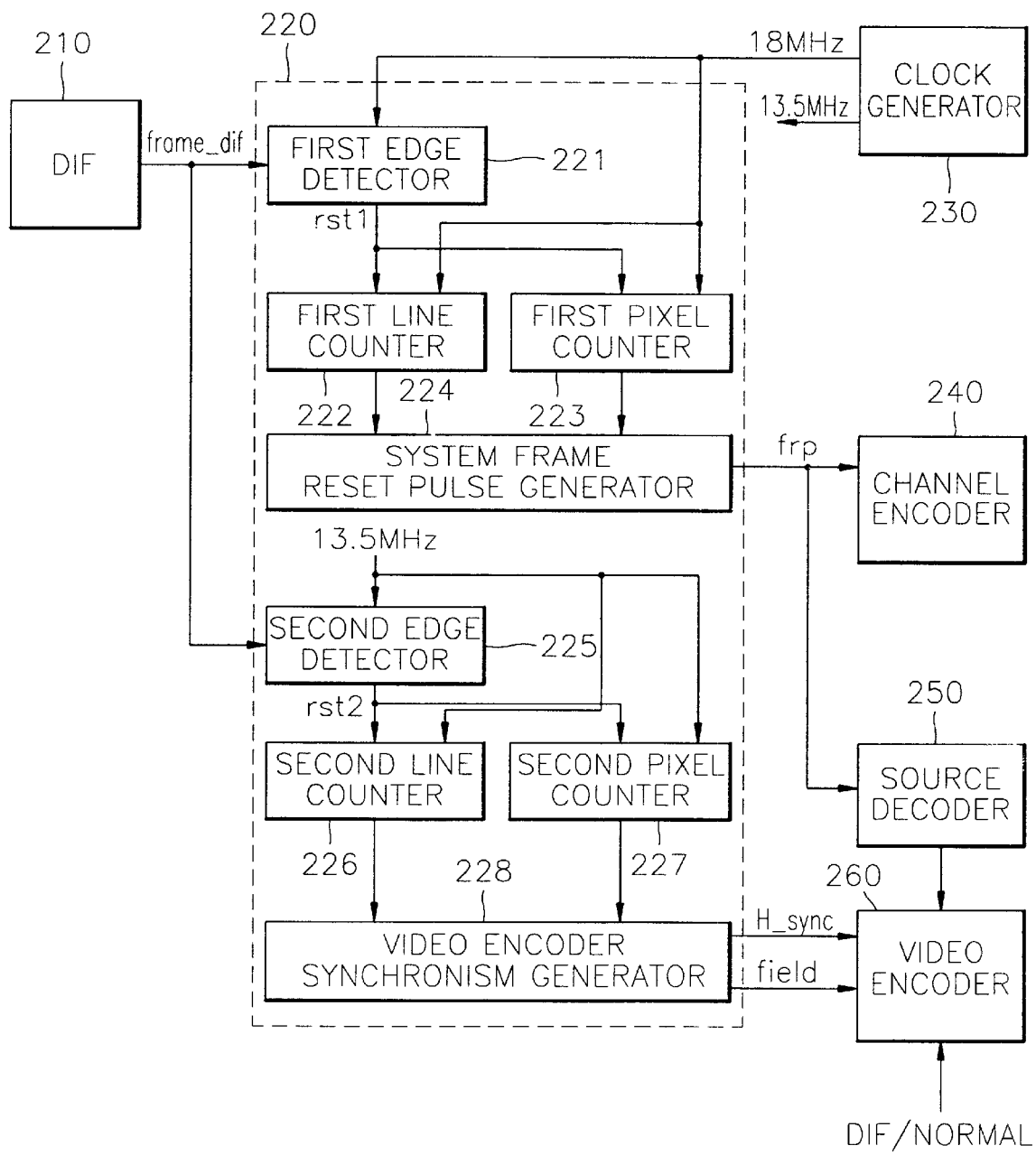
FIG. 4 is a detailed block diagram of a divider shown in FIG. 3.

FIG. 4 is a detailed block diagram of the divider shown in FIG. 3. The divider 220 includes first and second edge detectors 221 and 225, first and second line counters 222 and 226, first and second pixel counters 223 and 227, a system frame reset pulse generator 224, and a video encoder synchronism (sync) generator 228. The first edge detector 221, which is reset by the frame pulse (frame_dif) output from the digital interface 210, counts based on the 18 MHz clock signal generated in the clock generator 230, detects the edge of the frame pulse (frame_dif), and outputs a first reset signal (rst1). The first line counter 222 and the first pixel counter 223, which are reset by the first reset signal (rst1) output from the first edge detector 221, count lines and pixels, respectively, based on the 18 MHz clock output from the clock signal generator 230. The system frame reset pulse generator 224 generates the frame reset pulse (frp), based on the outputs of the first line counter 222 and the first pixel counter 223, and outputs the frame reset pulse (frp) to the channel encoder 240 and the source decoder 250.

The second edge detector 225, which is reset by the frame pulse (frame_dif) output from the digital interface 210, counts based on the 13.5 MHz clock signal generated in the clock generator 230, detects the edge of the frame pulse (frame_dif) and outputs a second reset signal (rst2). The second line counter 226 and second pixel counter 227, which are reset by the second reset signal (rst2), count lines and pixels, respectively, according to the 13.5 MHz clock signal generated by the clock generator 230. The video encoder sync generator 228 outputs the horizontal synchronizing signal (H_sync) and the field signal (field) to the video encoder 260, based on the outputs of the second line counter 226 and the second pixel counter 227.

Figure 5:
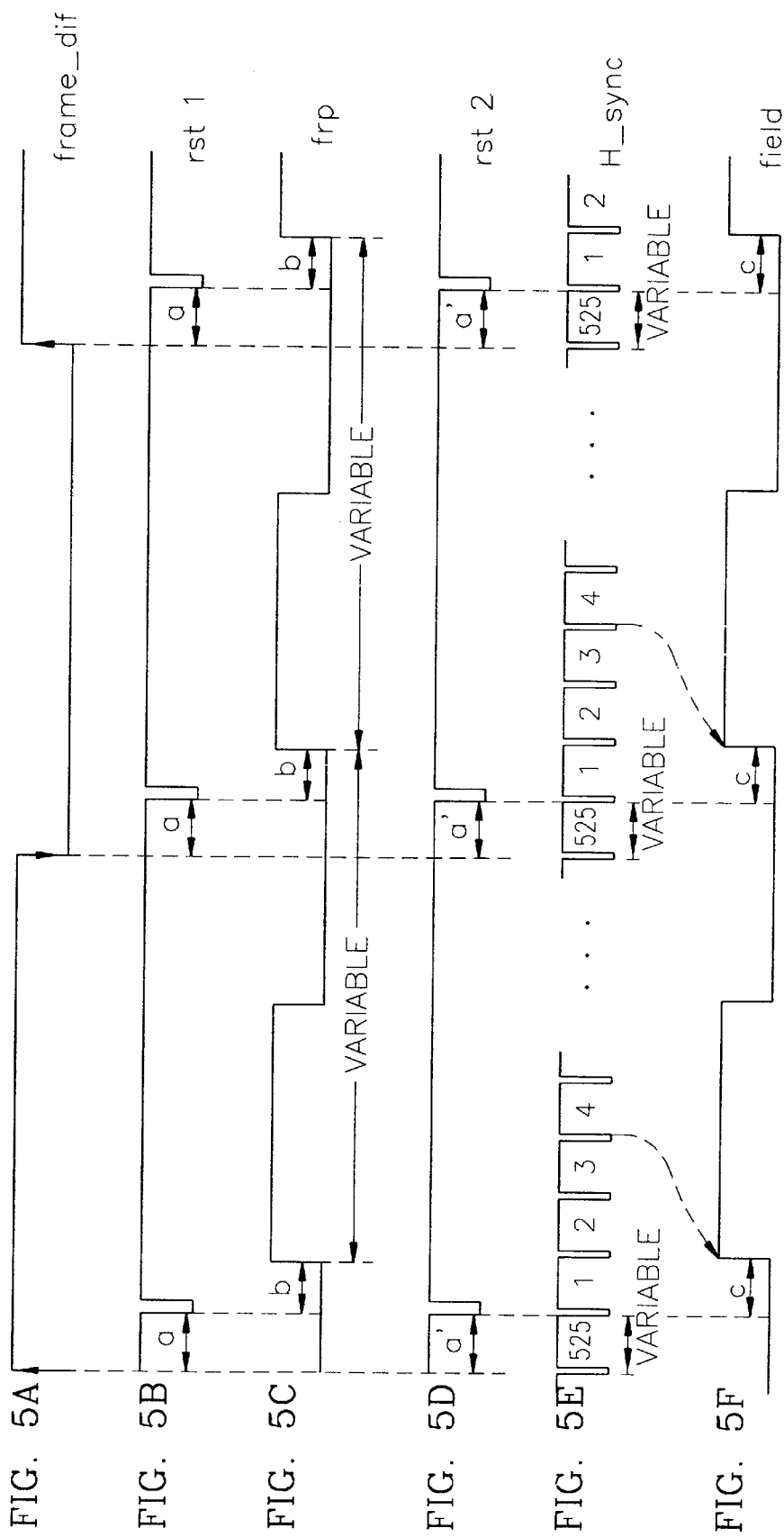
FIG. 5 is a timing diagram of input and output signals of the divider shown in FIG. 4.

When the frame pulse (frame_dif) shown in FIG. 5A is output from the digital interface 210, the first edge detector 221 detects the edge of the frame pulse (frame_dif) based on the 18 MHz clock signal generated by the clock generator 230, counts the 18 MHz clock signal for as much time (here, marked "a") as is required by the digital interface 210, generates a first reset signal (rst1) shown in FIG. 5B, and resets the first line counter 222 and the first pixel counter 223 to a pre-designated value. The system frame reset pulse generator 224 generates the frame reset pulse (frp) shown in FIG. 5C after delaying for a predetermined time after the first line counter 222 and the first pixel counter 223 are reset by the first reset signal (rst1). The period of the frame pulse can vary because the frame reset pulse (frp) of the present invention is generated in response to the edge of the frame pulse (frame_dif).

The second edge detector 225 detects the edge of the frame pulse (frame_dif) shown in FIG. 5A, based on the 13.5 MHz clock signal generated by the clock generator 230, counts the 13.5 MHz clock signal for as much time (here, marked "a'") as is required by the digital interface 210, generates the second reset signal (rst2) shown in FIG. 5D, and resets the second line counter 226 and the second pixel counter 227 to a pre-designated value. The video encoder sync generator 228 generates the horizontal synchronizing signal (H_sync) shown in FIG. 5E and the field signal (field) shown in FIG. 5F, based on the count values of the second line counter 226 and the second pixel counter 227. The horizontal period of the last line (the 525th line in the case of NTSC) as shown in FIG. 5E can vary. The field signal (field) shown in FIG. 5F is generated in synchronization with a fourth horizontal synchronizing signal, and operates as a field discriminating signal or a field synchronizing signal.

The counters 222, 223, 226, and 227 are reset in the pixel count value in the middle of the last line (the 525th line in the case of NTSC) in which data is not processed in the system. When the counters are reset in this way, the video signal processing of one frame is identical to that of a conventional system, and the length of one frame can be longer or shorter than that of the conventional system. The length of one frame varying can be solved by free-oscillating the color burst signal in the video encoder 260.

Figure 6:
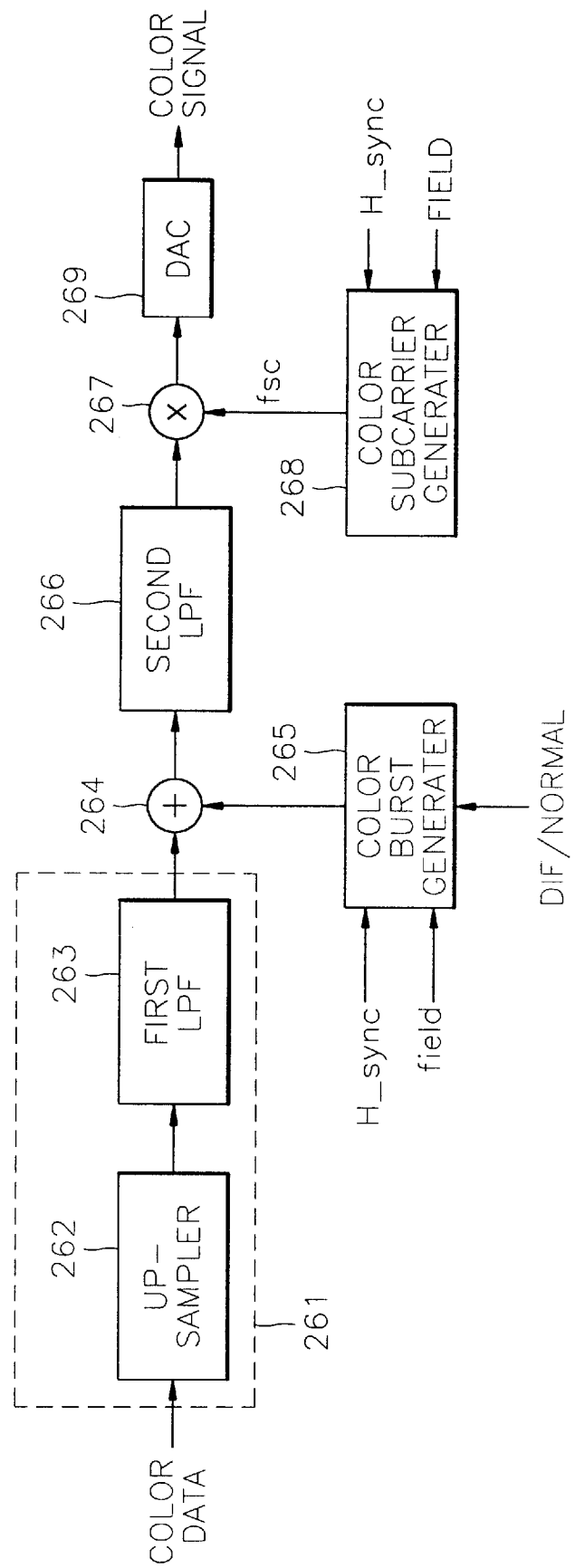
FIG. 6 is a detailed circuit diagram of a color signal processor of a video encoder shown in FIG. 3.

FIG. 6 is a detailed circuit diagram of a color signal processor of the video encoder 260 shown in FIG. 3. An interpolator 261, including an up-sampler 262 and a first low pass filter 263, separates color data from the data output from the source decoder 250 shown in FIG. 3, interpolates the color data, and outputs the interpolated color data. At this time, the color data input to the interpolator 261 is the color data output from the source decoder 250. An adder 264 adds the interpolated color data to the color burst signal generated by the color burst generator 265, and outputs the result to a mixer 267 via a second low pass filter. The second low pass filter 266 restricts the band of the color signal before it is modulated by the output signal of a color subcarrier ($f_{sc}$) generator 268. The mixer 267, which includes a multiplier, mixes the color data, including the color burst signal output from the second low pass filter 266, with a color subcarrier, and outputs the mixed result to a digital/analog converter (DAC) 269. The color subcarrier ($f_{sc}$) is generated by the color subcarrier generator 268, based on the horizontal synchronizing signal (H_sync) and the field signal (field) output from the divider 220 of FIG. 3. The DAC 269 outputs an analog color signal.

The color burst generator 265 and the color subcarrier generator 268, which can be constructed out of a memory such as a ROM, reset the color burst signal in order to maintain a color frame sequence in a normal mode. The color burst signal is reset based on the horizontal synchronizing signal (H_sync) and the field signal (field) input to the color burst generator 265, every four fields in the case of the NTSC system and every eight fields in the case of the PAL system. The color burst generator 265 resets the color burst signal in a normal mode, based on the digital interface/normal mode signal (DIF/NORMAL). Therefore, the variability of the period of the frame reset pulse is solved by performing color encoding without reset, thereby maintaining the varying frame length. Thus, the frame synchronization of the four or eight field sequence is not performed, but the picture can still be displayed.

In the frame synchronizing device of the present invention, it is possible to save design costs and to widen the precision range of the external signal, which is required by equipment operated as a slave, because a high precision voltage controlled oscillator is not necessary.

What is claimed is:

1. A frame synchronizing device for synchronizing systems having a digital interface, comprising:

a digital interface, for extracting frame time information included in a received signal from an external source; and a generator for generating a frame reset signal based on synchronizing signals by said systems, wherein said systems are reset by said frame reset signal, and wherein said synchronizing signals are generated by said frame time information.

2. A frame synchronizing device as claimed in claim 1, further comprising a signal processor, for free-oscillating a color burst signal during a digital interface mode, when said received signal is source-decoded and then encoded into a display signal, and for resetting said color burst signal based on said synchronizing signals during a normal mode.

3. A frame synchronizing device as claimed in claim 1, wherein said digital interface is IEEE 1394.

4. A frame synchronizing device for synchronizing systems having a digital interface, comprising:
- a digital interface, for extracting frame time information included in a received signal from an external source;
- a generator for generating a frame reset signal based on synchronizing signals by said systems,
- wherein said systems are reset by said frame rest signal;
- wherein said synchronizing signals are generated by said frame time information; and
- wherein said digital interface further comprises:
  - a receiving unit for receiving said received signal from said external source in the form of a transport packet, removing an extra header of said transport packet and outputting data having no extra header;
- a buffer for temporarily storing said data having no extra header;
- a time stamp extractor for extracting a time stamp included in said transport packet;
- a cycle timer for counting, based on a reference clock included in said transport packet, outputting a count value, and renewing said count value in every cycle start packet; and
- a comparator for comparing said frame time information included in said time stamp with said count value, and generating a frame pulse.

5. A frame synchronizing device as claimed in claim 4, wherein said generator generates said frame reset signal delayed by a predetermined time as compared to said frame pulse, considering the inner bus margin of said digital interface and time for writing data into said buffer.

6. A frame synchronizing device as claimed in claim 4, further comprising a clock generator for generating first and second system clock signals required for said systems.

7. A frame synchronizing device as claimed in claim 6, wherein said generator comprises:
- a first edge detector, which is reset by said frame pulse output from said digital interface, for detecting the edge of said frame pulse based on said first system clock signal, and for outputting a first reset signal;
- a first line counter and a first pixel counter, which is reset by said first reset signal, for counting lines and pixels, respectively, based on said first system clock signal;
- a first generator for generating said frame reset signal based on the outputs of said first line counter and said first pixel counter;
- a second edge detector, which is reset by said frame pulse output from said digital interface, for detecting the edge of said frame pulse based on said second system clock signal, and for outputting a second reset signal;
- a second line counter and a second pixel counter, which is reset by said second reset signal, for counting lines and pixels, respectively, based on said second system clock signal; and
- a second generator for generating a horizontal synchronizing signal and a field signal based on the outputs of said second line counter and said second pixel counter.

8. A frame synchronizing device as claimed in claim 7, further comprising:
- a channel encoder, which is reset by said frame reset signal generated by said first generator, for channel-encoding data read from said buffer and transferring the read data to a recording medium;
- a source decoder, which is reset by said frame reset signal, for source-decoding data read from said buffer; and
- a video encoder, which is reset by said horizontal synchronizing signal and said field signal output from said second generator, for encoding data output from said source decoder into a display signal.

9. A frame synchronizing device as claimed in claim 8, wherein the color burst signal is free-oscillated during said digital interface mode, and the color burst signal is reset at a period of a predetermined number of fields based on said horizontal synchronizing signal and said field signal output from said second generator during said normal mode.

10. A frame synchronizing device as claimed in claim 9, wherein the data stored in said buffer is transferred to said source decoder and said channel encoder, after said system is reset by said frame reset signal, during said digital interface mode.

11. A frame synchronizing device for synchronizing a master system with a slave system, comprising:
- an extractor for extracting reference time information transferred from said master system; and
- a generator for generating a reset signal based on synchronizing signals required for said slave system,
- wherein said slave system is periodically reset by said reset signal, and wherein said synchronizing signals are generated by said reference time information.

12. A frame synchronizing method for synchronizing between systems having a digital interface, comprising the steps of:
- (a) extracting frame time information included in a received signal from an external source, during a digital interface mode; and
- (b) generating a frame reset signal based on said frame time information and synchronizing signals required by said systems, and resetting said systems by said frame reset signal.

13. A frame synchronizing method for synchronizing between systems having a digital interface, comprising
- (a) extracting frame time information included in a received signal from an external source, during a digital interface mode; and
- (b) generating a frame reset signal based on synchronizing signals by said systems, and resetting said systems by said frame reset signal, and generating said synchronizing signals by said frame time information,
- wherein said (a) further comprises:
  - (a1) receiving data in the form of a transport packet from the external source, removing an extra header of the transport packet, and outputting data having no extra header;
  - (a2) storing said data having no extra header;
  - (a3) extracting a time stamp included in said transport packet;
  - (a4) counting based on a reference clock included in said transport packet, outputting a count value, and renewing said count value at every cycle start packet; and
  - (a5) comparing said frame time information included in said time stamp with said count value and generating a frame pulse.

14. A frame synchronizing method for synchronizing between systems having a digital interface, comprising the steps of:
- (a) extracting frame time information included in a received signal from an external source, during a digital interface mode; and (b) generating a frame reset signal based on said frame time information and synchronizing signals required by said systems, and resetting said systems by said frame reset signal;

wherein said frame reset signal is generated after delaying said frame pulse by a predetermined time, said frame pulse considering the inner bus margin of said digital interface.

15. A frame synchronizing method as claimed in claim 14, wherein said the sub-steps of (b) comprises the sub-steps of:

(b1) detecting the edge of the frame pulse based on a first system clock, resetting based on said frame pulse, and outputting a first reset signal;

(b2) counting lines and pixels based on said first system clock, resetting based on said first reset signal, and outputting a first count value;

(b3) generating a frame reset signal based on said first count value;

(b4) detecting the edge of said frame pulse based on a second system clock, resetting based on said frame pulse, and outputting a second reset signal;

(b5) counting lines and pixels based on said second system clock, resetting based on said second reset signal, and outputting a second count value; and (b6) generating a horizontal synchronizing signal and a field signal based on said second count value.

16. A frame synchronizing method as claimed in claim 15, further comprising:

(c) channel-encoding the data stored in said step (a2), transferring the channel-encoded data to a recording medium, and resetting a channel encoder based on said frame reset signal;

(d) source-decoding the data stored in said step (a2), outputting the source-decoded data, and resetting a source decoder based on said frame reset signal; and (e) encoding said source-decoded data into a display signal and resetting a video encoder based on said horizontal synchronizing signal and said field signal.

17. A frame synchronizing method as claimed in claim 16, wherein a color burst signal is free-oscillated during said digital interface mode, and said color burst signal is reset at a period of a predetermined number of fields based on said horizontal synchronizing signal and said field signal during said normal mode in said (e).

18. A frame synchronizing method as claimed in claim 16, further comprising a step of transferring the data stored in said (a2) to said (c) and (d) after said system is reset by said frame reset signal.

19. A frame synchronizing method for synchronizing systems having a digital interface, comprising:

(a) extracting frame time information included in a received signal transferred from an external source, during a digital interface mode;

(b) generating a frame reset signal, a horizontal synchronizing signal, and a field signal based on said frame time information and resetting said systems by said frame reset signal; and (c) free-oscillating a color burst signal when said receiving signal is source-decoded and encoded into a display signal during said digital interface mode.

20. A frame synchronizing method as claimed in claim 19, wherein said color burst signal is reset by said horizontal synchronizing signal and said field signal during a normal mode in said (c).

21. A frame synchronizing method for synchronizing a master system with a slave system, comprising:

(a) extracting reference time information transferred from said master system; and (b) generating a reset signal based on said reference time information, periodically resetting said slave system based on said reset signal, and generating synchronizing signals required for said slave system based on said reset signal.

* * * * *